E. S. MARTIN.
LEVELING ROD.
APPLICATION FILED MAR. 7, 1913.
1,220,358. Patented Mar. 27, 1917.
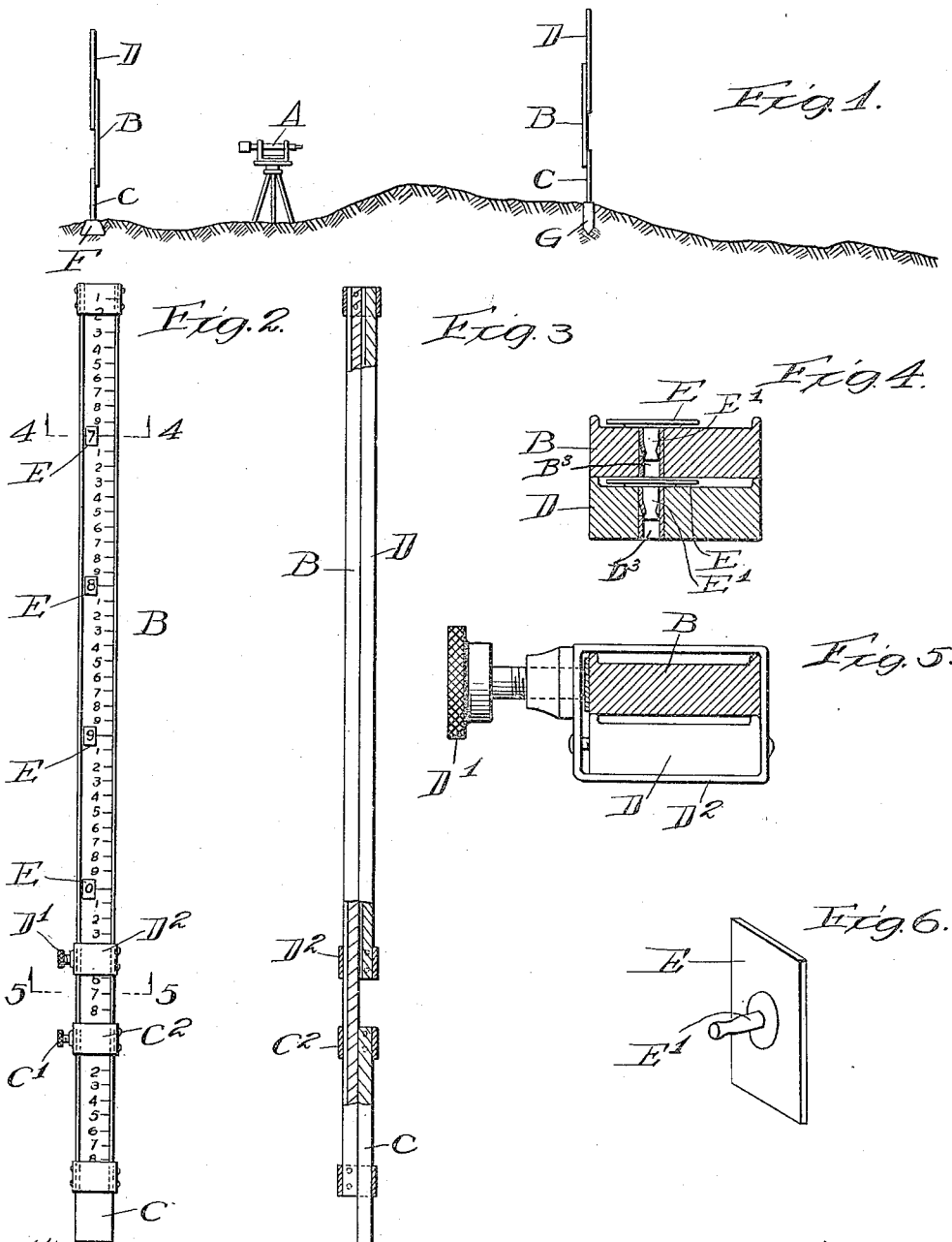
Witnesses:
Inventor:
Ernest S Martin
by Burton & Burton
his Atty s

UNITED STATES PATENT OFFICE.

ERNEST S. MARTIN, OF CHICAGO, ILLINOIS, ASSIGNOR TO LEWIS A. NICHOLS, OF CHICAGO, ILLINOIS.

LEVELING-ROD.

1,220,358.  Specification of Letters Patent.  Patented Mar. 27, 1917.

Application filed March 7, 1913. Serial No. 752,590.

*To all whom it may concern:*

Be it known that I, ERNEST S. MARTIN, a citizen of the United States, residing at Chicago, in the county of Cook and State of Illinois, have invented certain new and useful Improvements in Leveling-Rods, of which the following is a specification, reference being had to the accompanying drawings, forming a part thereof.

The purpose of this invention is to provide a leveling rod adapted to simplify the operation of "leveling" as performed in surveying, by giving a direct indication of the actual elevations of the various points at which readings are taken, and thus eliminating the usual computation required for determining such actual elevations. It consists of the features and elements described and shown in the drawings as indicated by the claims.

In the drawings:—

Figure 1 is a diagram illustrating the mode of use of the leveling rod which is the subject of this invention.

Fig. 2 is a front elevation of a leveling rod embodying this invention.

Fig. 3 is a side elevation of the same partly in section.

Fig. 4 is a detail section at line 4—4 on Fig. 2.

Fig. 5 is a detail section at line 5—5 on Fig. 2.

Fig. 6 is a perspective detail view of a removable unit marker for the leveling rod.

As is well understood by those familiar with the art of surveying, the process of leveling involves, first, setting up and adjusting the telescope, A, to a level position, next determining its elevation with respect to some assumed base, such as sea level or lake level, and then by sighting through the telescope, A, upon the usual form of leveling rod set up at different points along the line whose profile is to be determined, noting the height of the instrument, A, above said various points as measured by the graduated rod. For this purpose, therefore, the rod is always graduated from the bottom upward; its reading at the point intersected by the line of sight of the instrument, A, is a measure of the distance from this line of sight to the foot of the rod as it rests on the ground at the point whose actual elevation is required. This distance when subtracted from the total elevation of the instrument above the assumed base, viz: sea level or lake level, thus gives the actual elevation of the particular point above such base. It may be noted that in most cases where a previous survey has been run, the assumed base for the leveling operation is not sea level or lake level but is the previously determined elevation of some point commonly called a "bench mark" with respect to such sea or lake level; but for determining the actual elevations of various points along the line the leveling rod readings at this point must be subtracted from a similarly taken reading upon the bench mark, and then added to the known elevation of such bench mark; or other equivalent computation must be made to determine the actual elevations of the several points.

It is the object of the present invention to eliminate practically all of the computation above referred to. Referring to Fig. 2, it will be seen that the leveling rod, B, is provided with a slidably extensible foot, C, which may be secured in any position within its range of movement by a clamping screw, $C^1$. If desired, the rod may be also provided with a similarly slidable extension member, D, which will serve simply for increasing the length of the rod if necessary in use; the member, D, is likewise provided with a clamping screw shown at $D^1$. The forward faces of the rods, B and D, are divided in units of any desired length, such as feet or meters, and subdivided into equal parts of such units, preferably decimal parts. But the unit numerals are not permanently fixed in their places but are printed or painted upon removable markers, E, and to avoid contact of the sliding guides, $C^2$ and $D^2$, with these markers, E, as well as to protect the other graduations of the rod from wear, the graduated surfaces are preferably made channeled in form, as indicated in Figs. 4 and 5.

The purpose of these various features may be most clearly indicated by an example of the mode of use of the device. Suppose the previously determined elevation of the bench mark, F, (see Fig. 1) to be 109.7 feet above sea level, then with the leveling instrument set up as shown, and with the foot, C, of the rod on the bench mark, F, the graduated portion, B, is adjusted vertically with respect to the foot, C, until the line of sight from the instrument, A, intersects the scale at one of the "seven-tenths" marks. It will be noted that the decimal graduations number downwardly along the rod, so that if the numeral 9 is placed at the first unit mark above the seven-tenths mark sighted upon, the apparent reading of the rod will be 9.7, and this will be understood as 109.7, which is the actual elevation of the bench mark, F. The remainder of the graduated scale of the rod is now supplied with consecutively arranged numeral markers at the unit points, as indicated in Fig. 2, and with the foot piece, C, securely clamped in its adjusted position by means of the clamping screw, $C^1$, the rod is carried to the first point, G, whose elevation is to be determined. Then by rotating the telescope of the instrument at, A, so as to sight upon the rod in the new position at, G, the readings will indicate directly the actual elevation of this point, G; for if the point is higher than the bench mark, F, the line of sight will intersect the rod at a point below the 9.7 mark, giving a proportionately higher reading; and if the point, G, is lower than the bench mark, F, the reading will come nearer the top of the rod and its numerical value will be lower proportionately. In a similar manner additional readings are taken on other points along the line whose profile contour is to be determined, and in each instance the reading of the leveling rod will furnish directly the information desired as to the elevation of the point in question.

For rendering the unit numeral markers, E, conveniently removable from the face of the rod, they may each be provided with a dowel pin, $E^1$, projecting from the rear face of the marker and adapted to fit snugly in the holes, $B^3$ and $D^3$, arranged in the graduated face of each of the scale-bearing members at the unit marks of their scales. With each leveling rod there will then be furnished a set of these markers, E, labeled from zero to nine, respectively, or by providing a double set of such markers the unit points of the scale could be labeled to correspond with both the tens and units digits of the number representing the elevation of the bench mark chosen as a base, it being understood that with the entire length of the extension member, D, in use, the leveling rod will ordinarily comprise a graduated length of ten feet.

I claim:—

1. A graduated leveling rod, having removable and interchangeable numerals for the principal scale divisions thereof.

2. A graduated leveling rod having a channeled face and removable and interchangeable marking plates adapted to be secured to the bottom of such channel for indicating the principal scale divisions of the rod.

3. A graduated leveling rod comprising a principal member and an extension member slidably secured to the back thereof, removable and interchangeable marking plates for the principal scale divisions of the rod, and means on both members for securing said marking plates, the extension member having a channeled face affording space for the marking plates between said member and the principal member.

4. A graduated leveling rod and removable and interchangeable numeral plates for the principal scale divisions thereof, the rod being provided with sockets at its principal graduations, and each of said plates having a projection formed to fit in such sockets.

5. A leveling rod comprising a graduated portion, a foot piece upon which said portion is mounted for bodily vertical adjustment, and removable and interchangeable numerals for the principal scale divisions of the graduated portion.

In testimony whereof I have hereunto set my hand at Chicago, Illinois, this 4th day of March, 1913.

ERNEST S. MARTIN.

Witnesses:
A. W. McAULEY,
A. E. OLSON.